US008750618B2

(12) United States Patent
Aljahdali et al.

(10) Patent No.: US 8,750,618 B2
(45) Date of Patent: Jun. 10, 2014

(54) METHOD FOR CODING IMAGES WITH SHAPE AND DETAIL INFORMATION

(75) Inventors: Sultan Hamadi Aljahdali, Taif (SA); Fayas Asharindavida, Taif (SA); Nisarahmed Hundewale, Taif (SA)

(73) Assignee: Taif University, Taif (SA)

( * ) Notice: Subject to any disclaimer, the term of this patent is extended or adjusted under 35 U.S.C. 154(b) by 0 days.

(21) Appl. No.: 13/621,216

(22) Filed: Sep. 15, 2012

(65) Prior Publication Data

US 2013/0194453 A1 Aug. 1, 2013

Related U.S. Application Data

(60) Provisional application No. 61/593,298, filed on Jan. 31, 2012.

(51) Int. Cl.
*G06K 9/00* (2006.01)
(52) U.S. Cl.
USPC .......................................................... 382/181

(58) Field of Classification Search
USPC .................. 382/100, 165, 181, 183, 195, 203
See application file for complete search history.

(56) References Cited

U.S. PATENT DOCUMENTS

| | | | |
|---|---|---|---|
| 8,175,925 B1 * | 5/2012 | Rouaix | 705/22 |
| 2011/0145093 A1 * | 6/2011 | Paradise et al. | 705/26.41 |
| 2012/0016661 A1 * | 1/2012 | Pinkas | 704/9 |
| 2012/0127276 A1 * | 5/2012 | Tsai et al. | 348/47 |
| 2012/0229657 A1 * | 9/2012 | Calman et al. | 348/207.1 |
| 2013/0033522 A1 * | 2/2013 | Calman et al. | 345/633 |
| 2013/0112751 A1 * | 5/2013 | Maurer et al. | 235/454 |

* cited by examiner

*Primary Examiner* — Phuoc Tran
(74) *Attorney, Agent, or Firm* — Chun-Ming Shih

(57) ABSTRACT

A method for coding image data together with its shape and other details as a two dimensional barcode is disclosed. The method stores the shape details together with the color information of a product which is very useful for representing to a user. The method enables the encoding of an image with its shape, size, name and other details of the product in a most compact way. Also, the method enables decoding of the information to get the detailed information without using internet.

6 Claims, 6 Drawing Sheets

METHOD FOR CODING IMAGES WITH SHAPE AND DETAIL INFORMATION

CROSS-REFERENCE TO RELATED APPLICATIONS

This application claims the benefit of the filing date of provisional application No. 61,593,298, filed on Jan. 31, 2012. The contents of the provisional application are incorporated by reference in its entirety.

FIELD OF THE INVENTION

The present invention relates to a field of image processing and information coding. More particularly, the present invention is related to a method for coding image data with its shape and other details thus making the recognition part easy.

BACKGROUND AND PRIOR ART

Technology is advanced to a higher level and communication becomes so easy with the latest mobile and handheld devices. Such a life style demands all the tasks to be done quickly, easily and efficiently.

Internet is in the forefront for getting all kinds of information about anything. People use it to search for details about a product or a place or any service. This process will consume more time and has become tedious with the busy life today. Apart from this the information we get from this will not be real time and may be an outdated one.

Organizations and companies use various methods as a way to market their products or services. They will put advertisements about their new product or service with its qualities and attributes emphasized in a very good and attracted way. Printed media are the first one and later tried online media also to do the same in a much better way. But today, mobile devices are changing the scenario and making our lives very simple and useful by reducing the time spent in all the activities.

There exist various methods for identifying and recognizing products in the market. There are serial numbers and generally barcodes for identifying and recognizing the item with its other attributes. The information in these kinds of codes is very less and primitive. Nowadays there are some two dimensional barcodes which stores some text information as well as some links which give information about the product.

Information got from the existing two dimensional codes are also very less and it cannot represent the product as such. To get more information from it we need to access the link which is coded. For that we need Internet access without knowing the relevance and exact requirement of the product. Thus, there exists a need for a mechanism where a user gets more details from the code given without accessing the Internet.

SUMMARY OF THE INVENTION

The present invention provides a method to recognize the information related to the product by getting the shape, color and other related information from the code. By this, user gets all the related information without accessing the Internet and without any time delay.

The present invention provides a method to enable the recognition of information, where the images are captured using their mobile devices. The mobile device includes a capturing device, expandable memory and digital signal processor for processing the images.

In another aspect, the present invention provides a method for encoding and decoding detailed information of a product.

In still another aspect, the present invention provides a method for recognizing relevant and real-time information to users and businesses.

The method provided by the present invention enables recognizing the information coded in the generic two dimensional binary codes.

In a preferred embodiment of the method, the present invention provides a new encoding and decoding standard for embedding shape and color features together with other details of an image which represents a product.

In another preferred embodiment of the method, the present invention provides a method to recognize the relevant information from the details decoded without the use of Internet. The user will get a better understanding about the product or service without going to the link as in the existing method.

The present invention provides algorithms and mechanisms for encoding and decoding of image data. The present invention does not require Internet access for the mobile devices to get the information about the product and hence, is time and cost effective.

Further objects, features and advantages will become apparent from the following description, claims, and drawings.

BRIEF DESCRIPTION OF THE DRAWINGS

Above aspects of the inventions are described in detail with reference to the attached drawings, where.

DETAILED DESCRIPTION OF THE INVENTION

Figure 1:
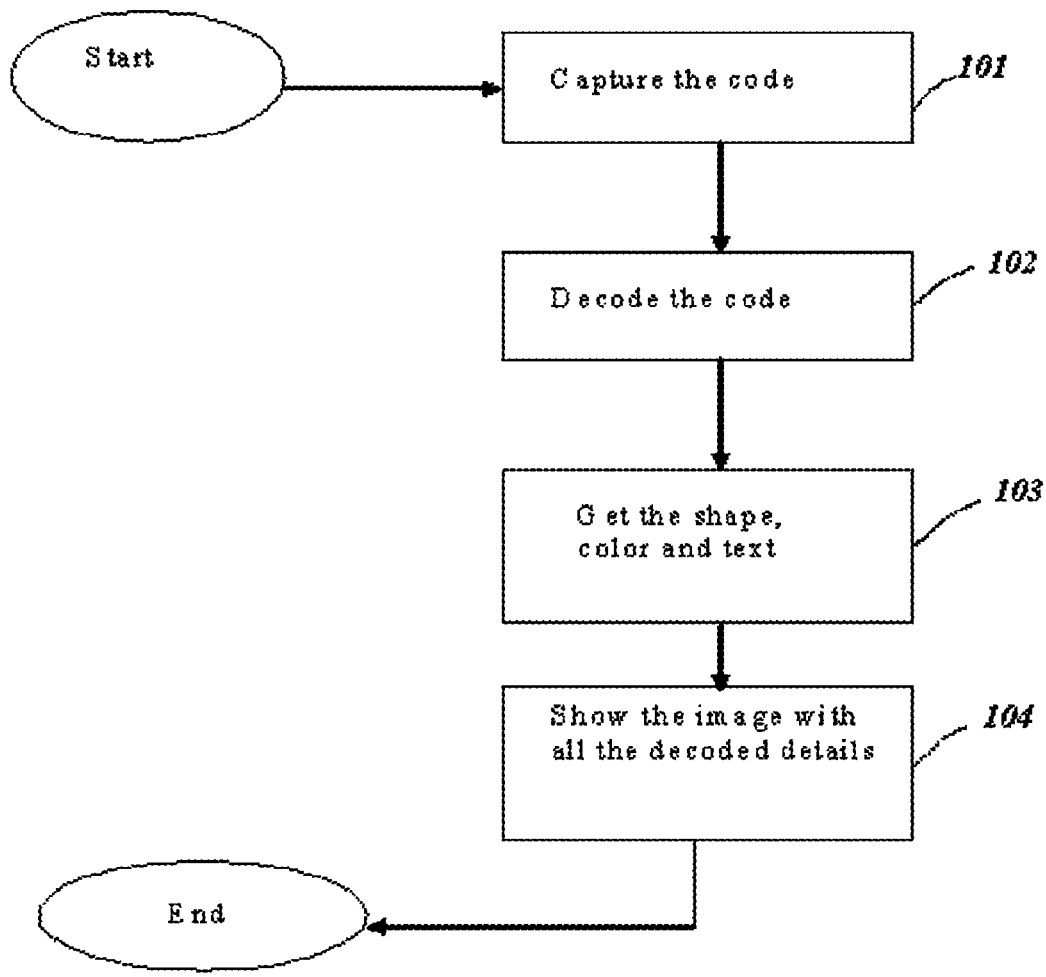
FIG. 1 shows the overall flow of the system and the various components in the system.

FIG. 1 shows the overall flow of the method. This invention is mainly into coding the shape and color features of images along with its text data into binary codes. The method includes the step (101) of capturing a code using any image capturing device. The image capturing device can be any mobile or handheld device which has some storage space and processing unit in it. Once the system gets the code which is denoised and segmented, the decoding procedure has to be applied on to it. Here denoising means removing the noises happened during the image capturing time. A modified version of masking filter is used to get deblurred and sharpened image. While capturing the code some other parts also come in the image, so segmentation is to be done to get the correct code area. Region selection for the decoding is done based on the focused area and shape of the code area. In the step (102) of decoding procedure the standards used for pattern and further the various algorithms used are extracted. The standards and the algorithms used are explained in the further figures. Once the step (102) is done, get the shape and color features from it as in the step (103). Information of algorithms used for constructing and coding the features are understood from the step (102) itself. A final step (104) is to represent the image with all these features (that is shape and color) and show it on the display device of the mobile or handheld device.

Figure 2:
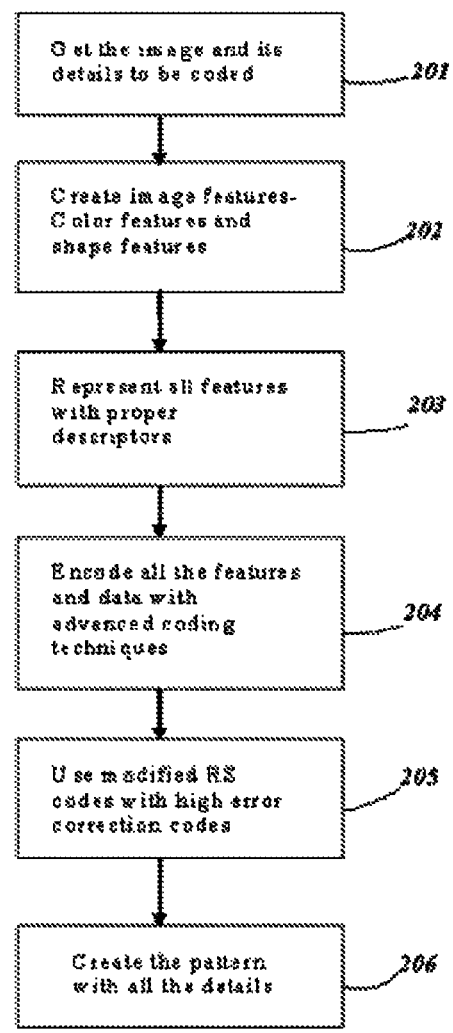
FIG. 2 shows the flow diagram for the encoding process according to one embodiment of the method of the invention.

FIG. 2 illustrates the procedure of encoding data. First, in the step (201), identify the data to be encoded, which contains the image together with its text and other related data. In the step (202), construct the features which represent the shape of the image, and get the color features for the representative colors of the image. In the step (203), these features are represented using descriptors which are constructed using a hybrid technique which involves Fourier and scale invariant methods. The descriptor selection is done so that its reconstruction rate is high and the dimensionality reduction techniques are applied to it efficiently. This is done by changing them into sparse matrix representation. The descriptors which represent these data are now encoded using high compressive rated codes as in the step (204). The advanced coding technique used here uses the concepts of compressive sensing. The next step (205) uses an advanced error correction code which is a modified version of Reed Solomon (RS) codes which has high correcting power. RS code has a limitation for error correction. In the new method, error correction capability is high by modifying the existing technique using compressive sensing methods. So now it is ready with all the codes to represent the data. It's time to create the pattern based on this data as in the step (206).

Figure 3:
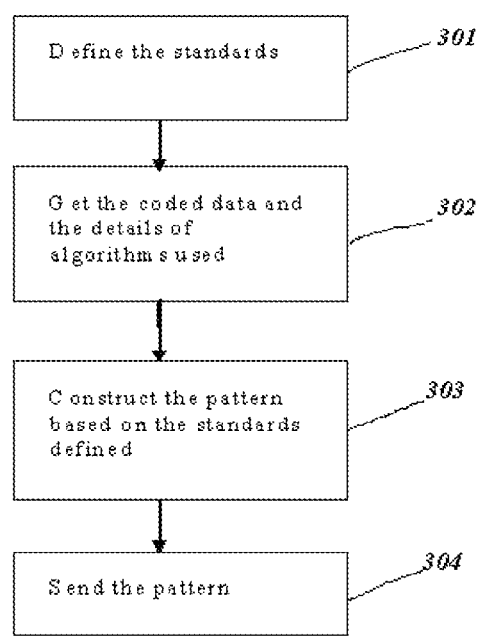
FIG. 3 shows the flow diagram for creating the pattern with the data encoded.

FIG. 3 illustrates the steps for creating the pattern with all details. In the creation of the pattern first thing is the defining of standards for the correct placing of data to make it generic as in the step (301). The way in arranging these details in the code is a modified version because it contains the fields for the algorithms used for coding. The algorithms which are used for extracting the features, descriptors which are used for representing features, size and type of data are to be defined. This is helpful at the time of decoding. When this becomes generic and predefined, the decoding process can search these areas for which algorithms have to be used on what type of data, etc.

Get the data which are to be added to the pattern in the step (302). Make it appropriate with the standard defined for the pattern. Construct the pattern based on the standards defined along with the data provided in the step (303). Next step (304) is to send the pattern created to the system.

Figure 4:
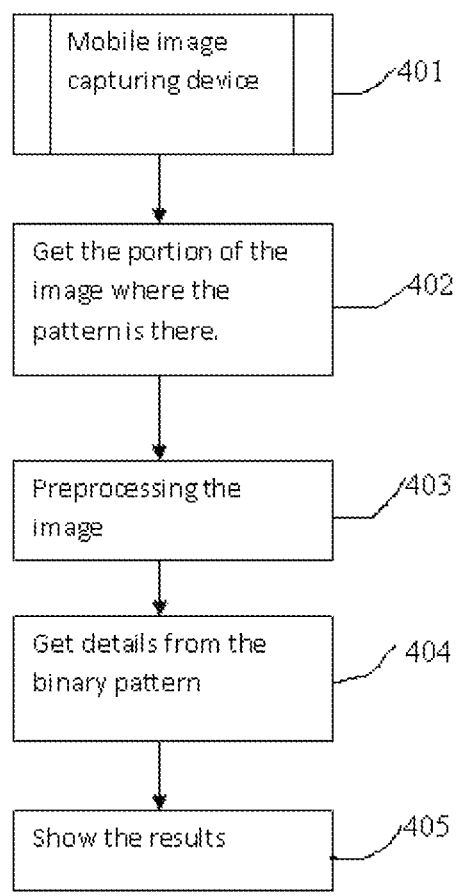
FIG. 4 illustrates the flow of the overall decoding process.

FIG. 4 illustrates the decoding procedure for the system. Decoding system including a mobile device is provided in the step (401). The mobile device can be any image capturing device with a good camera, storage capacity and a processing unit. Capture the image where the pattern is printed in the step (402). Definitely the image captured will contain extra contents other than the pattern. And also there might occur many kinds of noises to the image, such as blur, some distortion, etc. These noises have to be removed as mentioned in FIG. 5 below and only the pattern has to be taken in the step (403) for decoding. Once the preprocessed image is received, extract the details from the pattern as mention in FIG. 6 below in the step (404). Show the details of the image with its shape and color reconstructed together with its other details which are coded as in the step (405).

Figure 5:
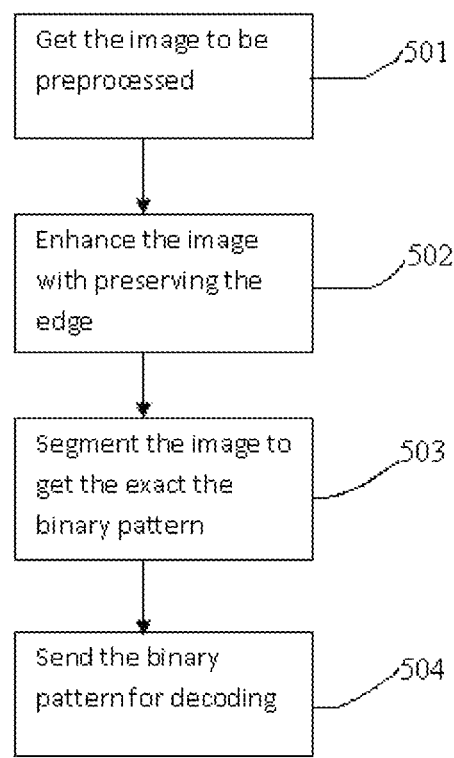
FIG. 5 illustrates the preprocessing steps to be applied in the decoding process.

FIG. 5 illustrates the preprocessing procedure. Get the portion of the image which contains the pattern in the step (501). Apply denoising and enhancement techniques while preserving its strong edge details in the step (502). In the denoising, deblurring and enhancement techniques are applied. Segment the image for getting the exact pattern from the image in the step (503). Send this pattern extracted for the decoding process as in the step (504).

Figure 6:
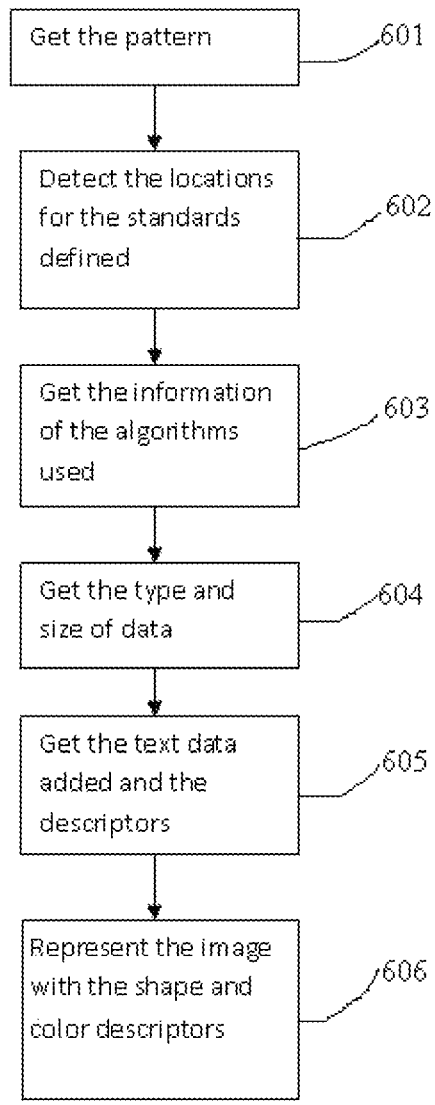
FIG. 6 shows the logical diagram about how the data is extracted from the pattern.

FIG. 6 illustrates about the various methods used for extracting data from the pattern. Get the preprocessed and segmented pattern in the step (601). Detect the locations for the standards defined for the start of the pattern, end of pattern, etc. in the step (602). From the standards, in the step (603), get the information of the algorithms used for the feature extraction, descriptor creation and error correction coding. From pattern standard get the type and size of the data in the step (604). In the next step (605), get the descriptors for the shape and color features. The text data which are encoded are also extracted in this step. Represent the image with the shape features and color features in the descriptor as in the step (606). Show the image with its shape and color information together with its text and other data to the display system.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A method for creating generic binary patterns to code images, the method comprising the steps of:
   a) getting an image of a product to be coded with text information;
   b) developing descriptors from a shape and a color of the product;
   c) constructing a binary pattern with the shape and the color of the product using advanced error correcting codes;
   d) a device capturing the binary pattern, processing the binary pattern using a decoding process in the device and getting the descriptors for the shape and the color together with the text information of the product; and
   e) representing the shape and the color of the product from decoded information and display in the device.

2. The method according to claim 1, wherein the device is a mobile or handheld device comprising an image capturing unit, a storage unit and a processing unit.

3. A method for defining a standard for placing codes in a pattern, the method comprising the steps of:
   a) identifying a type and a size of a data to be encoded;
   b) getting information of algorithms used for a feature extraction for a shape and a color of a product;
   c) constructing details of a descriptor;
   d) analyzing error correcting code details;
   e) placing each one in different position in the pattern so that it become a generic place for identifying the shape and the color of the product from the pattern.

4. A method for obtaining information about a product which is encoded, comprising:
   a) capturing an image of the product using a mobile device;
   b) preprocessing the image to remove all noises and segmenting a pattern alone;
   c) identifying details and algorithms used based on standards defined on the pattern;
   d) showing a shape and a color and all other descriptions of the product; and
   e) displaying results on the device to know the shape and the color of the product.

5. The method according to claim 4, wherein the mobile device is a handheld device comprising an image capturing unit, a storage unit and a processing unit.

6. The method according to claim 4, wherein the information about the product or service is processed in the device itself without connecting to Internet or taking extra communication.

* * * * *